United States Patent
Shi

(10) Patent No.: US 9,857,890 B2
(45) Date of Patent: Jan. 2, 2018

(54) INFORMATION PROCESSING METHOD AND ELECTRONIC APPARATUS

(71) Applicants: Beijing Lenovo Software Ltd., Beijing (CN); Lenovo (Beijing) Co., Ltd., Beijing (CN)

(72) Inventor: Bin Shi, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 173 days.

(21) Appl. No.: 14/868,656

(22) Filed: Sep. 29, 2015

(65) Prior Publication Data

US 2016/0378210 A1 Dec. 29, 2016

(30) Foreign Application Priority Data

Jun. 26, 2015 (CN) .......................... 2015 1 0363094

(51) Int. Cl.
*G06F 3/041* (2006.01)
*G06F 3/044* (2006.01)
(Continued)

(52) U.S. Cl.
CPC .......... *G06F 3/03545* (2013.01); *G06F 3/044* (2013.01); *G06F 3/0414* (2013.01);
(Continued)

(58) Field of Classification Search
CPC .... G06F 3/03545; G06F 3/041; G06F 3/0414; G06F 3/0416; G06F 3/044; G06F 3/0488; G06F 3/04883; G06F 2203/04106
See application file for complete search history.

(56) References Cited

U.S. PATENT DOCUMENTS

| 4,839,634 A * | 6/1989 | More | G06K 9/24 |
| | | | 178/18.09 |
| 5,194,852 A * | 3/1993 | More | G06F 3/04883 |
| | | | 178/18.03 |

(Continued)

FOREIGN PATENT DOCUMENTS

CN 101763185 A 6/2010
CN 101923439 A 12/2010
(Continued)

OTHER PUBLICATIONS

First Chinese Office Action regarding Application No. 201510363094.3 dated Jul. 31, 2017. English translation provided by http://globaldossier.uspto.gov.

*Primary Examiner* — Michael J Eurice
(74) *Attorney, Agent, or Firm* — Harness, Dickey & Pierce, P.L.C.

(57) ABSTRACT

An information processing method and an electronic apparatus are disclosed. The method is applicable to the electronic apparatus. The method includes: detecting, with a touch display unit of the electronic apparatus, a first trajectory generated by a first input operation of an input unit; acquiring motion parameters of the input unit collected by a sensing unit in a case that it is determined that the first trajectory meets a predetermined condition; and using the motion parameters to correct the first trajectory in accordance with a first correction strategy.

11 Claims, 6 Drawing Sheets

(51) Int. Cl.
  *G06F 3/0488* (2013.01)
  *G06F 3/0354* (2013.01)

(52) U.S. Cl.
  CPC ........ *G06F 3/0416* (2013.01); *G06F 3/04883* (2013.01); *G06F 3/041* (2013.01); *G06F 3/0488* (2013.01); *G06F 2203/04106* (2013.01)

(56) References Cited

U.S. PATENT DOCUMENTS

| | | | | |
|---|---|---|---|---|
| 5,855,000 A | * | 12/1998 | Waibel | G06K 9/03 382/186 |
| 5,995,084 A | * | 11/1999 | Chan | G06F 3/03547 345/173 |
| 6,057,830 A | * | 5/2000 | Chan | G06F 3/04883 345/157 |
| 6,650,320 B1 | * | 11/2003 | Zimmerman | G06F 3/0317 345/158 |
| 6,754,386 B1 | * | 6/2004 | Williamson | G06K 9/00865 382/177 |
| 6,973,214 B1 | * | 12/2005 | Shim | G06K 9/00416 178/18.03 |
| 7,453,439 B1 | * | 11/2008 | Kushler | G06F 3/0237 345/168 |
| 2002/0011993 A1 | * | 1/2002 | Lui | G06F 3/04883 345/179 |
| 2002/0180797 A1 | * | 12/2002 | Bachmann | G06F 3/0236 715/780 |
| 2004/0165774 A1 | * | 8/2004 | Koubaroulis | G06K 9/00409 382/179 |
| 2004/0190085 A1 | * | 9/2004 | Silverbrook | G06F 3/03545 358/474 |
| 2004/0190092 A1 | * | 9/2004 | Silverbrook | G06F 3/03545 358/539 |
| 2005/0088418 A1 | * | 4/2005 | Nguyen | G06F 3/03545 345/173 |
| 2007/0040813 A1 | * | 2/2007 | Kushler | G06F 3/0237 345/173 |
| 2007/0230790 A1 | | 10/2007 | Tonouchi | G06K 9/00422 382/187 |
| 2008/0131852 A1 | * | 6/2008 | Van Hofwegen | G09B 11/04 434/165 |
| 2008/0260251 A1 | * | 10/2008 | Predovic | G06K 9/00422 382/187 |
| 2009/0115744 A1 | * | 5/2009 | Zhang | G06F 3/0346 345/179 |
| 2009/0123073 A1 | * | 5/2009 | Nelson | G06K 9/00416 382/189 |
| 2010/0021022 A1 | * | 1/2010 | Pittel | G06F 3/03545 382/123 |
| 2010/0309147 A1 | * | 12/2010 | Fleizach | G06F 3/04883 345/173 |
| 2011/0243448 A1 | * | 10/2011 | Kawabuchi | G06K 9/00416 382/187 |
| 2012/0013578 A1 | * | 1/2012 | Huang | G06F 3/03545 345/179 |
| 2012/0038674 A1 | * | 2/2012 | Stergiou | G06F 3/0213 345/650 |
| 2012/0050221 A1 | * | 3/2012 | Kolokowsky | G06F 3/044 345/174 |
| 2012/0141032 A1 | * | 6/2012 | Ouyang | G06K 9/00422 382/187 |
| 2012/0216141 A1 | * | 8/2012 | Li | G06K 9/00416 715/780 |
| 2012/0262407 A1 | * | 10/2012 | Hinckley | G06F 3/038 345/173 |
| 2013/0238312 A1 | * | 9/2013 | Waibel | G10L 15/00 704/8 |
| 2014/0146001 A1 | * | 5/2014 | Baba | G06F 3/04883 345/174 |
| 2015/0010216 A1 | * | 1/2015 | Papastefanou | 382/120 |
| 2015/0205501 A1 | * | 7/2015 | Fujii | G06F 3/0484 715/763 |
| 2015/0221070 A1 | * | 8/2015 | Winnemoeller | G06T 11/001 382/203 |
| 2015/0221106 A1 | * | 8/2015 | Winnemoeller | G06F 3/01 345/441 |
| 2015/0242114 A1 | * | 8/2015 | Hirabayashi | G06F 3/04883 345/156 |
| 2016/0034027 A1 | * | 2/2016 | Sheng | G06F 3/005 345/173 |
| 2016/0078847 A1 | * | 3/2016 | Zhang | G06F 17/214 345/472.3 |
| 2016/0132232 A1 | * | 5/2016 | Baba | G06K 9/00402 715/268 |
| 2016/0179222 A1 | * | 6/2016 | Chang | G06F 3/03545 345/179 |
| 2016/0179364 A1 | * | 6/2016 | Nicholson | G06F 3/04883 715/863 |

FOREIGN PATENT DOCUMENTS

| | | |
|---|---|---|
| CN | 102135821 A | 7/2011 |
| CN | 102662499 A | 9/2012 |
| CN | 103310474 A | 9/2013 |
| CN | 103744541 A | 4/2014 |
| WO | WO-2015083290 A1 | 6/2015 |

* cited by examiner

INFORMATION PROCESSING METHOD AND ELECTRONIC APPARATUS

CROSS REFERENCE TO RELATED APPLICATIONS

The present application claims the priority to Chinese Patent Application No. 201510363094.3, titled "INFORMATION PROCESSING METHOD AND ELECTRONIC APPARATUS", filed on Jun. 26, 2015 with the State Intellectual Property Office of People's Republic of China, which is incorporated herein by reference in its entirety.

FIELD

The disclosure relates to the field of information processing technology, and in particular to an information processing method and an electronic apparatus.

BACKGROUND

Electronic apparatuses are increasingly diversified as technology advances. In a technology, an electronic apparatus can convert words written on a touch display unit of the electronic apparatus by an input unit into an electronic document, where the input unit may be a stylus.

In a specific application, in a case that a user writes too fast on the electronic apparatus by using the input unit, the system of the electronic apparatus is unable to respond in a timely manner, thereby causing that a recognized writing trajectory has a breakpoint or is illegible, which affects the appearance of the writing trajectory, and is inconvenient for the user to view the writing trajectory.

This problem can not be solved yet in the conventional technology.

SUMMARY

In view of this, an information processing method and an electronic apparatus are provided according to the disclosure to solve the technical problem that, in a case that a user writes, with an input unit, too fast on the electronic apparatus, a system of the electronic apparatus is unable to respond in a timely manner thereby causing that the writing trajectory recognized by the electronic apparatus has a breakpoint or is illegible.

In order to achieve the above objects, the following technical solutions are provided according to the disclosure.

There is provided an information processing method applicable to an electronic apparatus, including:

detecting, with a touch display unit of the electronic apparatus, a first trajectory generated by a first input operation of an input unit;

acquiring motion parameters of the input unit collected by a sensing unit in a case that it is determined that the first trajectory meets a predetermined condition; and using the motion parameters to correct the first trajectory in accordance with a first correction strategy.

BRIEF DESCRIPTION OF THE DRAWINGS

To illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION OF THE EMBODIMENTS

The technical solutions of embodiments of the disclosure will be illustrated clearly and completely in conjunction with the drawings of the embodiments of the disclosure. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

According to the embodiments of the disclosure, there is disclosed an information processing method applicable to an electronic apparatus. Specially, the method includes: detecting, with a touch display unit of the electronic apparatus, a first trajectory generated by a first input operation of an input unit; acquiring motion parameters of the input unit collected by a sensing unit in a case that it is determined that the first trajectory meets a predetermined condition; and using the motion parameters to correct the first trajectory in accordance with a first correction strategy. Thus, in the present disclosure, in a case that the first trajectory meets the predetermined condition, which indicates that the trajectory generated by the input unit on the touch display unit of the electronic apparatus is unsatisfactory, for example, the first trajectory may have a breakpoint or is illegible, the first trajectory may be corrected, and thus it is convenient for the user to view the first trajectory.

Specially, according to a first embodiment of the disclosure, there is provided an information processing method applicable to an electronic apparatus such as a cell phone, a tablet computer, or a laptop computer.

Figure 1:
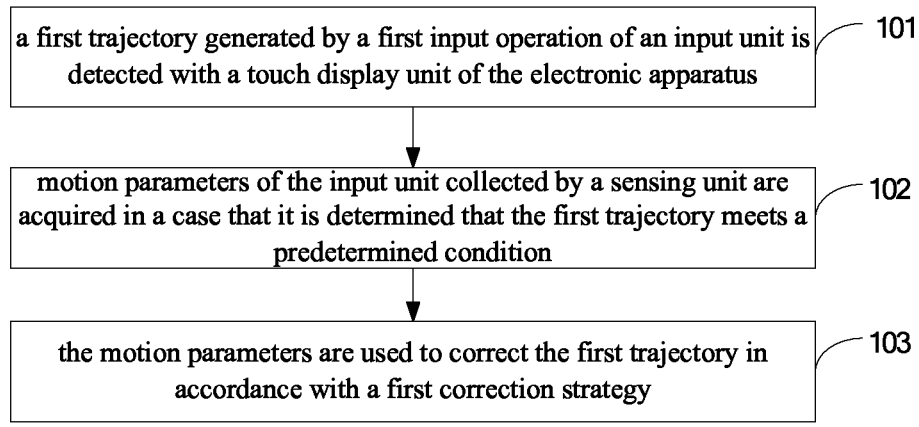
FIG. 1 is a flow chart of an information processing method according to a first embodiment of the disclosure.

As shown in FIG. 1, the method includes the following steps 101 to 103.

In step 101, a first trajectory generated by a first input operation of an input unit is detected with a touch display unit of the electronic apparatus.

The touch display unit may be a touch display screen with a touch display function which is disposed on the electronic apparatus.

In a case that a user performs, with the input unit, the first input operation (such as writing) on the touch display unit, the touch display unit of the electronic apparatus may detect the first trajectory corresponding to the first input operation.

The input unit may be a stylus, or a digital pen, etc.

It should be noted that, the input unit may perform the first input operation on the touch display unit of the electronic apparatus directly, that is, a part for performing the first input operation in relation to the input unit may contact the touch display unit of the electronic apparatus directly. The input unit may alternatively perform the first input operation on the touch display unit of the electronic apparatus indirectly, that is, the part for performing the first input operation in relation to the input unit may contact the touch display unit of the electronic apparatus indirectly. For example, a piece of writing paper may be laid on the touch display unit of the electronic apparatus, and the stylus may also generate the first trajectory on the touch display unit of the electronic apparatus in a case that the user writes on the writing paper with the stylus.

In step 102, motion parameters of the input unit collected by a sensing unit are acquired in a case that it is determined that the first trajectory meets a predetermined condition.

The sensing unit is configured to collect the motion parameters corresponding to the first operation performed by the input unit on the touch unit. Since the first input operation generates the first trajectory, the motion parameters also correspond to the first trajectory.

It should be noted that, the sensing unit may be disposed at a position on the input unit according to actual conditions. In the present embodiment, the sensing unit may be disposed at the part for contacting the touch display unit directly or indirectly in relation to the input unit, such as a tip of the stylus. The sensing unit may alternatively be disposed at other positions on the input unit, which is described in detail in the following.

Specially, the predetermined condition is a criteria for determining whether to correct the first trajectory, which may be set according to actual conditions.

As a first implementation, the determining that the first trajectory meets a predetermined condition includes: determining that there is a breakpoint at a first position on the first trajectory.

Specially, in a case that the user writes too fast, the electronic apparatus is unable to respond in a timely manner, thereby causing a missing portion of the trajectory, in this case, the first trajectory needs to be corrected.

As a second implementation, the determining that the first trajectory meets a predetermined condition includes: determining that a legibility of a portion of the first trajectory at a second position is lower than a predetermined legibility.

Specially, in a case that the user writes too fast, a force applied on the input unit by the user may be reduced spontaneously, which may cause that the first trajectory displayed on the electronic apparatus is illegible. Therefore the first trajectory needs to be corrected in a case that it is determined that the legibility of the portion of the first trajectory at the second position is lower than the predetermined legibility.

The predetermined legibility may be set according to actual conditions and is not limited in the disclosure. The legibility of the first trajectory may include a color depth of the first trajectory displayed by the electronic apparatus. The legibility of the first trajectory may also include a thickness of the first trajectory displayed by the electronic apparatus since the user can not see the first trajectory clearly if the first trajectory is too thin.

In step 103, the motion parameters are used to correct the first trajectory in accordance with a first correction strategy.

Corresponding to the first implementation for determining that the first trajectory meets the predetermined condition, the using the motion parameters to correct the first trajectory in accordance with a first correction strategy includes: using the motion parameters to complement the portion of the first trajectory at the first position in accordance with a first correction strategy. Since there is a breakpoint at the first position on the first trajectory, the portion of the first trajectory at the first position is complemented so as to make the first trajectory complete.

Corresponding to the second implementation for determining that the first trajectory meets the predetermined condition, the using the motion parameters to correct the first trajectory in accordance with a first correction strategy includes: using the motion parameters to complement the portion of the first trajectory at the second position in accordance with the first correction strategy. Since the portion of the first trajectory at the second position is illegible, the portion of the first trajectory at the second position is complemented so as to make the first trajectory legible.

The above two implementations are also applicable to other embodiments of the disclosure.

It should be noted that, in using the motion parameters to correct the first trajectory, characteristic parameters of a portion of the first trajectory adjacent to the portion of the first trajectory to be corrected, such as a characteristic parameter related to a thickness of the trajectory, or a characteristic parameter related to color rendering, may be used as a reference, to ensure that characteristics of the corrected portion of the trajectory is consistent with characteristics of the portion of the trajectory which is not corrected.

According to the embodiment of the disclosure, in a case that the touch display unit of the electronic apparatus detects the first trajectory generated by the input unit and the first trajectory meets the predetermined condition, the motion parameters of the input unit collected by the sensing unit are acquired, and the motion parameters are used to correct the first trajectory in accordance with the first correction strategy. In the present disclosure, in a case that the first trajectory meets the predetermined condition, which indicates that the trajectory generated by the input unit on the touch display unit of the electronic apparatus is not satisfactory, for example, the first trajectory may has a breakpoint or is illegible, in this case, the first trajectory may be corrected, and thus it is convenient for the user to view the first trajectory.

Figure 2A:
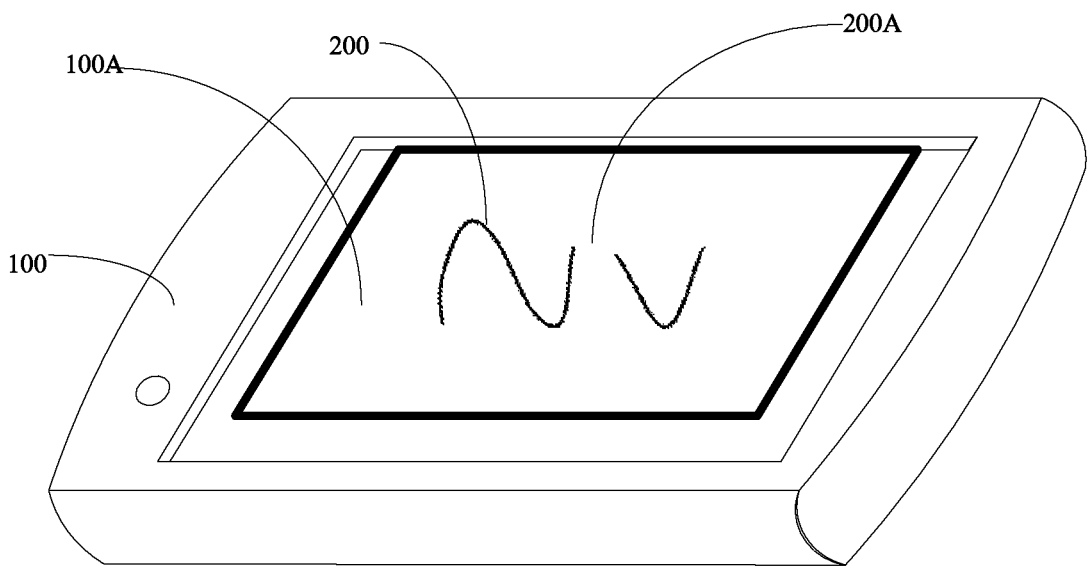
FIG. 2a is a schematic diagram of a first trajectory with a breakpoint according to the disclosure.
Figure 2B:
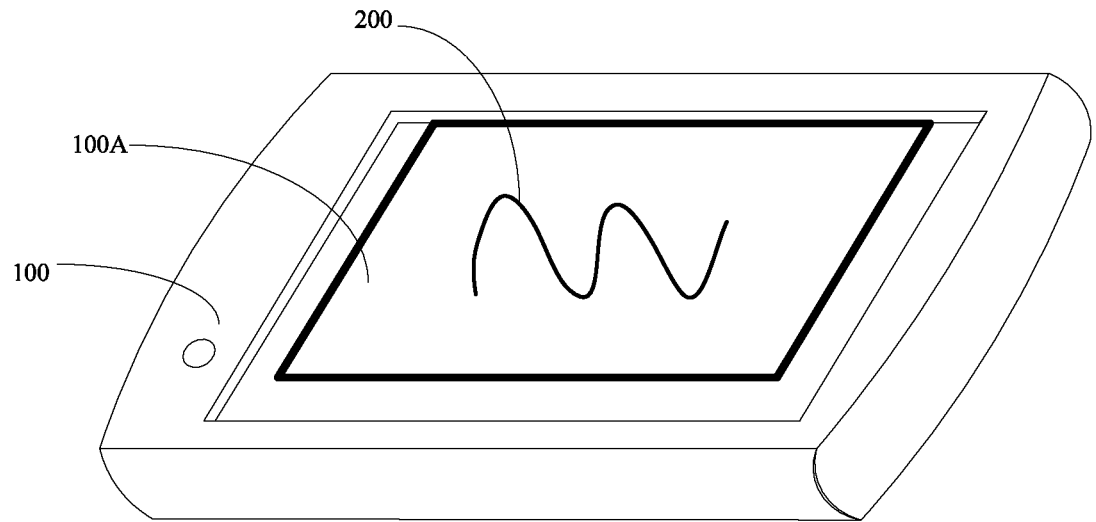
FIG. 2b is a schematic diagram of a corrected first trajectory according to the disclosure.

To facilitate understanding, a specific application example is used for simple illustration. As shown in FIG. 2a, an electronic apparatus 100 is provided with a touch display unit 100A. A user performs, with an input unit, a first input operation on the touch display unit 100A, such that a first trajectory 200 is generated. The electronic apparatus determines that there is a breakpoint at a first position 200A on the first trajectory 200. Then motion parameters of the input unit collected by a sensing unit are used to complement a portion of the first trajectory at the first position in accordance with the first correction strategy. The complemented first trajectory is as shown in FIG. 2b.

Figure 3:
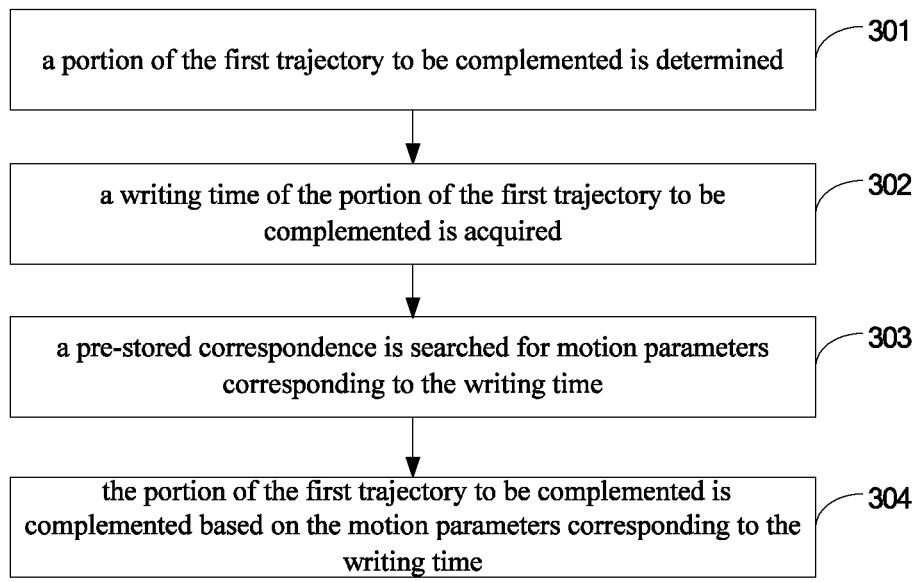
FIG. 3 is a flow chart of a part of an information processing method according to a second embodiment of the disclosure.

An information processing method is provided according to a second embodiment of the disclosure. In the second embodiment, how to use the motion parameters to correct the first trajectory in accordance with a first correction strategy is described in detail. Specially, as shown in FIG. 3, the using the motion parameters to correct the first trajectory in accordance with the first correction strategy includes the following steps 301 to 304.

In step 301, a portion of the first trajectory to be complemented is determined.

The portion of the first trajectory to be complemented is located at a position on the first trajectory which meets a predetermined condition. For example, there is a breakpoint at a first position on the trajectory. That is the portion of the first trajectory at the first position is the portion of the first trajectory to be complemented. As another example, the portion of the first trajectory at a second position is illegible. That is the portion of the first trajectory at the second position is the portion of the first trajectory to be complemented.

In step 302, a writing time of the portion of the first trajectory to be complemented is acquired.

When the user performs, with the input unit, the first input operation on the touch display unit of the electronic apparatus, the electronic apparatus may make a record of instants when the first trajectory is generated by the first input operation, and the instants correspond to positions where the first trajectory is generated. Therefore, the writing time of the portion of the first trajectory to be complemented may be obtained from the record.

In step 303, a pre-stored correspondence is searched for motion parameters corresponding to the writing time. The correspondence is a correspondence between motion parameters and writing times. Specially, when the user performs, with the input unit, the first input operation on the touch display unit of the electronic apparatus, the sensing unit may collect the motion parameters corresponding to the first trajectory generated by the first input operation, where the motion parameters are collected by the sensing unit while the first trajectory is written. The correspondence is pre-stored by the electronic apparatus.

In a case that the writing time of the portion of the first trajectory to be complemented is determined, the motion parameters corresponding to the writing time may be found according to the writing time. The found motion parameters are motion parameters for the portion of the first trajectory to be complemented.

In step 304, the portion of the first trajectory to be complemented is complemented based on the motion parameters corresponding to the writing time.

Since the motion parameters corresponding to the writing time are the motion parameters of the portion of the first trajectory to be complemented, the way of using the motion parameters corresponding to the writing time to complement the portion of the first trajectory to be complemented can ensure that the complemented first trajectory is consistent with the first trajectory generated by performing, with the input unit, the first operation on the touch display unit.

In the first embodiment, the sensing unit may be disposed at the part (such as the tip of the stylus) for touching the touch display unit directly or indirectly in relation to the input unit and may alternatively be disposed at other position of the input unit. The arrangement and implementations thereof are described in detail in a third embodiment of the disclosure.

Specially, the sensing unit includes a first sensor and a second sensor disposed on the input unit, where the first sensor is configured to sense a portion of the input unit held by the user. Therefore, the first sensor may be disposed at the portion of the input unit generally held by the user.

The second sensor is disposed at a second position on the input unit and configured to collect motion parameters of the portion of the input unit at the second position. In an actual application, when the user performs, with the input unit, the first input operation on the touch display unit, the closer to the portion of the input unit held by the user is, the smaller a motion amplitude of a portion of the input unit is. Therefore, the second sensor may be disposed at a position far from the position where the input unit is generally held by the user.

The first sensor may be a capacitive sensor or a pressure sensor, and the second sensor may be a motion sensor such as a gravity sensor.

Figure 4:
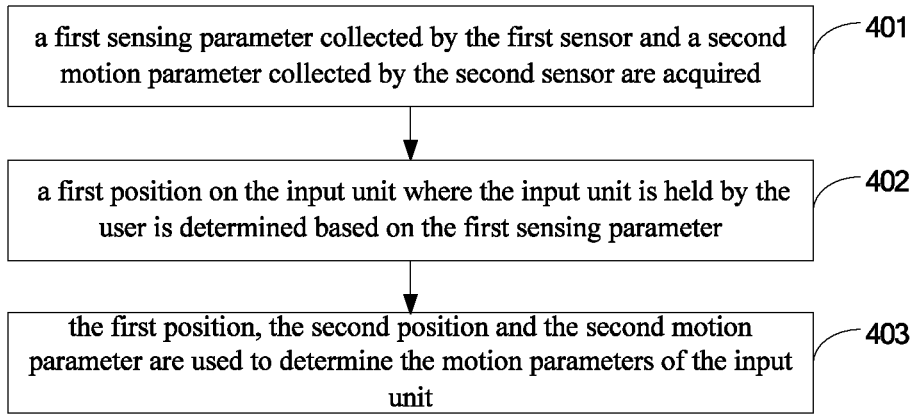
FIG. 4 is a flow chart of a part of an information processing method according to an embodiment of the disclosure.

Accordingly, as shown in FIG. 4, in the first embodiment the step of acquiring motion parameters of the input unit collected by a sensing unit may include the following steps 401 to 403.

In step 401, a first sensing parameter collected by the first sensor and a second motion parameter collected by the second sensor are acquired.

The first sensing parameter is used to determine the position where the input unit is held by the user. The second motion parameter is a motion parameter of the portion of the input unit at the second position generated when the first input operation is performed.

In step 402, a first position on the input unit where the input unit is held by the user is determined based on the first sensing parameter.

Specially, the position where the first sensing parameter collected by the first sensor is greater than a predetermined sensing parameter may be determined as the first position on the input unit where the input unit is held by the user. A specific sensing parameter may be set according to actual conditions.

In step 403, the first position, the second position and the second motion parameter are used to determine the motion parameters of the input unit.

The motion parameters of the input unit are parameters of a part for contacting the touch display unit directly or indirectly in relation to the input unit, which correspond to the first trajectory. For example, in a case that the input unit is a stylus, since a tip of the stylus contacts the touch display unit directly or indirectly, only motion parameters of the tip of the stylus are the parameters corresponding to the first trajectory. Therefore, it is required to use the first position, the second position and the second motion parameter to determine the motion parameters. The motion parameters may be determined with existing algorithms, which is not described in detail in the present disclosure.

Figure 5:
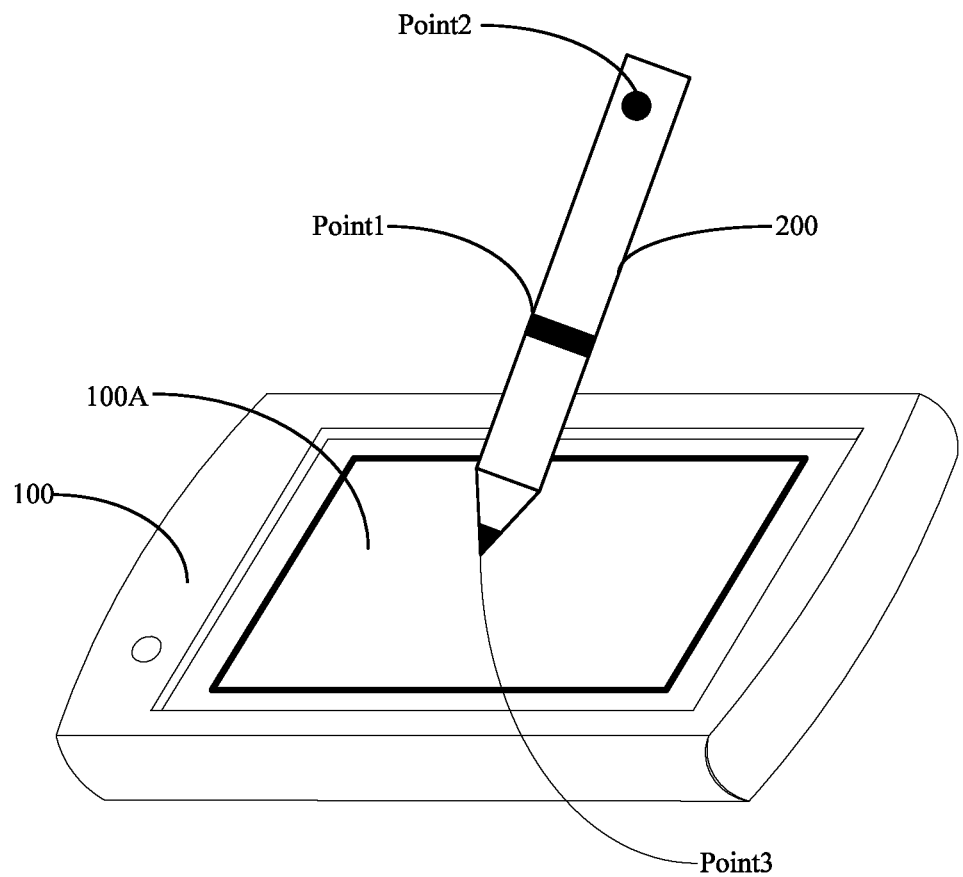
FIG. 5 is a schematic diagram of a stylus labeled with arrangement positions according to the disclosure.

A specific example for the third embodiment is shown in FIG. 5. A stylus 200 performs the first input operation on the touch display unit 100A of the electronic apparatus 100. The position where a portion of the stylus 200 is held by the user is determined as a first position Point 1 by using the first sensing parameter collected by the first sensor. The second sensor is disposed at a second position Point 2 on the stylus 200. In this case, the motion parameters of a tip Point 3 of the stylus 200 may be determined by using the first position Point 1, the second position Point 2 and the second motion parameter collected by the second sensor.

In the conventional technology, the electronic apparatus may start entering a recognition state when it is detected that the input unit contacts the touch display unit of the electronic apparatus. However, it may take a period of time for the electronic apparatus to enter into the recognition state.

Figure 6:
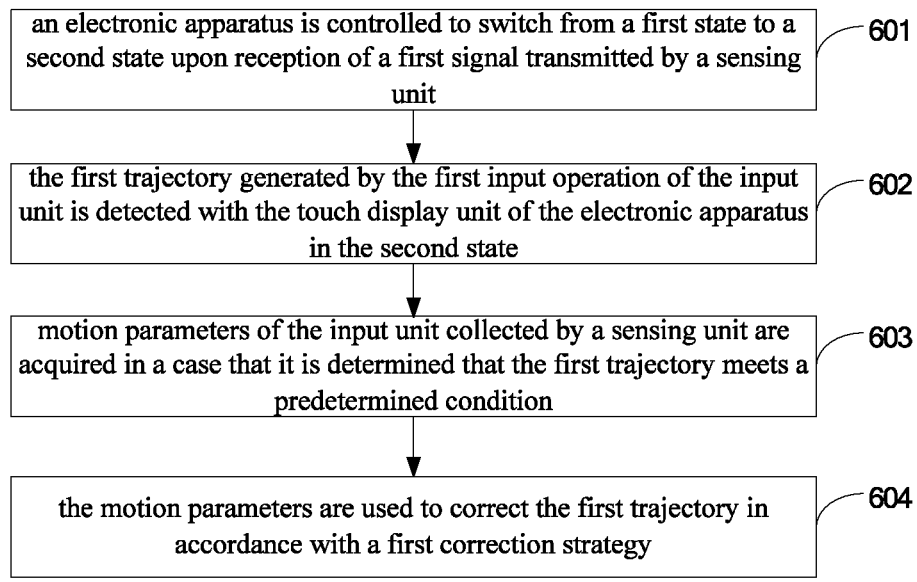
FIG. 6 is a flow chart of an information processing method according to a fourth embodiment of the disclosure.

Therefore, generally the electronic apparatus may fail to recognize an initial portion of the first trajectory generated by the input unit. In view of this, an information processing method is provided according to a fourth embodiment of the disclosure. As shown in FIG. 6, the method includes the following steps 601 to 604.

In step 601, an electronic apparatus is controlled to switch from a first state to a second state upon reception of a first signal transmitted by a sensing unit.

Specially, the sensing unit is disposed on the input unit, and may be configured to collect motion parameters of the input unit.

Specially, the first signal is a signal collected by the sensing unit when the input unit is held by the user.

That is, the sensing unit may transmit the collected first signal to the electronic apparatus when the input unit is held by the user. Since after the user holds the input unit, it takes a period of time for the user to hold the input unit to contact the touch display unit of the electronic apparatus, the electronic apparatus may perform state switching, i.e. switch from the first state to the second state, during this period of time, where the second state is the recognition state of the electronic apparatus. Thus, the electronic apparatus may start detecting the first trajectory generated by the first input operation of the input unit at the moment when the user holds the input unit to contact the touch display unit of the electronic apparatus and to start performing the first input operation, without switching state again, thus the initial portion of the first trajectory can be recognized by the electronic apparatus.

In step 602, the first trajectory generated by the first input operation of the input unit is detected with the touch display unit of the electronic apparatus in the second state.

In step 603, motion parameters of the input unit collected by a sensing unit are acquired in a case that it is determined that the first trajectory meets a predetermined condition.

In step 604, the motion parameters are used to correct the first trajectory in accordance with a first correction strategy.

An electronic apparatus is disclosed according to a fifth embodiment of the disclosure. The electronic apparatus may be a cell phone, a tablet computer, or a laptop computer.

Figure 7:
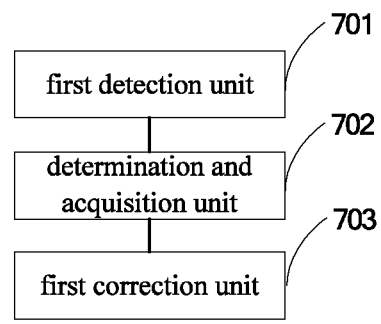
FIG. 7 is a schematic structural diagram of an electronic apparatus according to a fifth embodiment of the disclosure.

As shown in FIG. 7, the electronic apparatus includes a first detection unit 701, a determination and acquisition unit 702 and a first correction unit 703.

The first detection unit 701 is configured to detect, with a touch display unit of the electronic apparatus, a first trajectory generated by a first input operation of an input unit.

The determination and acquisition unit 702 is configured to acquire motion parameters of the input unit collected by a sensing unit in a case that it is determined that the first trajectory meets a predetermined condition.

The sensing unit is configured to collect the motion parameters corresponding to the first operation performed by the input unit on the touch unit. Since the first input operation generates the first trajectory, the motion parameters also correspond to the first trajectory.

Specially, the predetermined condition is a criteria for determining whether to correct the first trajectory, which may be set according to actual conditions.

As a first implementation, the determination and acquisition unit is configured to acquire the motion parameters of the input unit collected by the sensing unit in a case that it is determined that there is a breakpoint at a first position on the first trajectory.

As a second implementation, the determination and acquisition unit is configured to acquire the motion parameters of the input unit collected by the sensing unit in a case that it is determined that a legibility of a portion of the first trajectory at a second position is lower than a predetermined legibility.

The first correction unit 703 is configured to use the motion parameters to correct the first trajectory in accordance with a first correction strategy.

Corresponding to the first implementation in which the determination and acquisition unit determines that the first trajectory meets the predetermined condition, the first correction unit is configured to use the motion parameters to complement the portion of the first trajectory at the first position in accordance with a first correction strategy.

Corresponding to the second implementation in which the determination and acquisition unit determines that the first trajectory meets the predetermined condition, the first correction unit is configured to use the motion parameters to complement the portion of the first trajectory at the second position in accordance with the first correction strategy.

The above two implementations are also applicable to other embodiments of the disclosure.

According to the embodiment of the disclosure, in a case that the touch display unit of the electronic apparatus detects the first trajectory generated by the input unit and the first trajectory meets the predetermined condition, the motion parameters of the input unit collected by the sensing unit are acquired, and the motion parameters are used to correct the first trajectory in accordance with the first correction strategy. In the present disclosure, in a case that the first trajectory meets the predetermined condition, which indicates that the trajectory generated by the input unit on the touch display unit of the electronic apparatus is not satisfactory, for example, the first trajectory may has a breakpoint or is illegible, in this case, the first trajectory may be corrected, and thus it is convenient for the user to view the first trajectory.

Figure 8:
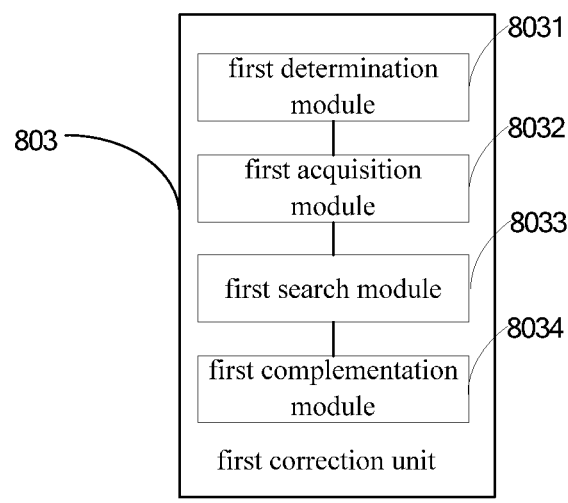
FIG. 8 is a schematic structural diagram of a first correction unit according to a sixth embodiment of the disclosure.

An electronic apparatus is provided according to a sixth embodiment of the disclosure. In the sixth embodiment, how the first correction unit uses the motion parameters to correct the first trajectory in accordance with a first correction strategy is described in detail. Specially, as shown in FIG. 8, the first correction unit 803 includes a first determination module 8031, a first acquisition module 8032, a first search module 8033, and a first complementation module 8034.

The first determination module 8031 is configured to determine a portion of the first trajectory to be complemented.

The portion of the first trajectory to be complemented is located at a position on the first trajectory which meets a predetermined condition.

The first acquisition module 8032 is configured to acquire a writing time of the portion of the first trajectory to be complemented.

When the user performs, with the input unit, the first input operation on the touch display unit of the electronic apparatus, the electronic apparatus may make a record of instants when the first trajectory is generated by the first input operation, and the instants correspond to positions where the first trajectory is generated. Therefore, the writing time of the portion of the first trajectory to be complemented may be obtained from the record.

The first search module 8033 is configured to search for motion parameters corresponding to the writing time based on a pre-stored correspondence.

The correspondence is a correspondence between motion parameters and writing times.

The first complementation module 8034 is configured to complement the portion of the first trajectory to be complemented based on the motion parameters corresponding to the writing time.

Since the motion parameters corresponding to the writing time are the motion parameters of the portion of the first trajectory to be complemented, the way of using the motion parameters corresponding to the writing time to complement the portion of the first trajectory to be complemented can ensure that the complemented first trajectory is consistent with the first trajectory generated by performing, with the input unit, the first operation on the touch display unit.

A specific arrangement of the sensing unit, and an implementation thereof are described in detail in a seventh embodiment of the disclosure.

Specially, the sensing unit includes a first sensor and a second sensor disposed on the input unit, where the first sensor is configured to sense a portion of the input unit held by the user. Therefore, the first sensor may be disposed at the portion of the input unit generally held by the user.

The second sensor is disposed at a second position on the input unit and configured to collect motion parameters of the portion of the input unit at the second position.

The first sensor may be a capacitive sensor or a pressure sensor, and the second sensor may be a motion sensor such as a gravity sensor.

Figure 9:
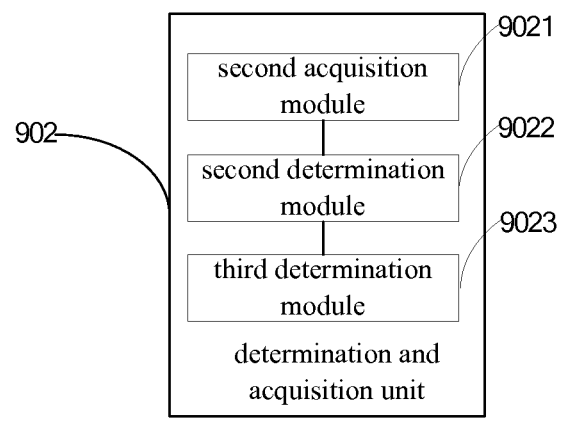
FIG. 9 is a schematic structural diagram of a determination and acquisition unit according to a seventh embodiment of the disclosure.

Accordingly, as shown in FIG. 9, the determination and acquisition unit 902 includes a second acquisition module 9021, a second determination module 9022 and a third determination module 9023.

The second acquisition module 9021 is configured to acquire a first sensing parameter collected by the first sensor and a second motion parameter collected by the second sensor in a case that it is determined that the first trajectory meets the predetermined condition.

The second determination module 9022 is configured to determine a first position on the input unit where the input unit is held by the user based on the first sensing parameter.

The third determination module 9023 is configured to use the first position, the second position and the second motion parameter to determine the motion parameters of the input unit.

The motion parameters of the input unit are parameters of a part for contacting the touch display unit directly or indirectly in relation to the input unit, which correspond to the first trajectory. Therefore, it is required to use the first position, the second position and the second motion parameter to determine the motion parameters. The motion parameters may be determined with existing algorithms, which is not described in detail in the present disclosure.

Figure 10:
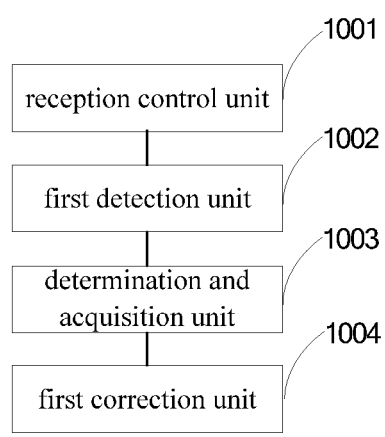
FIG. 10 is schematic structural diagram of an electronic apparatus according to an eighth embodiment of the disclosure.

An electronic apparatus is further provided according to an eighth embodiment of the disclosure. As shown in FIG. 10, the electronic apparatus includes a reception control unit 1001, a first detection unit 1002, a determination and acquisition unit 1003, and a first correction unit 1004.

The reception control unit 1001 is configured to control the electronic apparatus to switch from a first state to a second state upon reception of a first signal transmitted by a sensing unit.

Specially, the first signal is a signal collected by the sensing unit when the input unit is held by the user.

The sensing unit is disposed on the input unit, and may be configured to collect motion parameters of the input unit.

The sensing unit may transmit the collected first signal to the electronic apparatus when the input unit is held by the user. Since after the user holds the input unit, it takes a period of time for the user to hold the input unit to contact the touch display unit of the electronic apparatus, the electronic apparatus may perform state switching, i.e. switch from the first state to the second state, during this period of time, where the second state is the recognition state of the electronic apparatus. Thus, the electronic apparatus may start detecting the first trajectory generated by the first input operation of the input unit at the moment when the user holds the input unit to contact the touch display unit of the electronic apparatus and to start performing the first input operation, without switching 5 state again, thus the initial portion of the first trajectory can be recognized by the electronic apparatus.

The first detection unit 1002 is configured to detect, with the touch display unit of the electronic apparatus in the second state, the first trajectory generated by the first input operation of the input unit.

The determination and acquisition unit 1003 is configured to acquire motion parameters of the input unit collected by a sensing unit in a case that it is determined that the first trajectory meets a predetermined condition The device embodiments correspond to the method embodiments, and are not described in detail. The detailed description of the device embodiments may refer to the method embodiments.

The embodiments of the present disclosure are described herein in a progressive manner, and each embodiment places emphasis on the difference from other embodiments, therefore one embodiment can refer to other embodiments for the same or similar parts. For the apparatus disclosed in the embodiments, since the apparatus corresponds to the method disclosed in the embodiments, the description is relatively simple, and relevant part of the description may refer to the description according to the method embodiments.

With the above descriptions of the disclosed embodiments, those skilled in the art may achieve or use the present disclosure. Various modifications to the embodiments are apparent for those skilled in the art. The general principle defined herein may be implemented in other embodiments without departing from the spirit or scope of the disclosure. Therefore, the present disclosure is not limited to the embodiments disclosed herein, but confirm to the widest scope in consistent with the principle and the novel features disclosed herein.

The invention claimed is:

1. An information processing method, comprising:
   detecting, with a touch display unit of an electronic apparatus, a first trajectory generated by a first input operation of an input unit;
   acquiring motion parameters of the input unit collected by a sensing unit of the input unit in a case that it is determined that the first trajectory meets a predetermined condition, wherein the motion parameters of the input unit are collected by the sensing unit when the first trajectory is generated by the input unit;
   determining a portion of the first trajectory to be complemented;
   determining a time period during which the portion of the first trajectory to be complemented is generated;
   determining motion parameters collected by the sensing unit of the input unit during the time period; and
   complementing the portion of the first trajectory to be complemented based on the motion parameters collected by the sensing unit of the input unit during the time period.

2. The method according to claim 1, wherein the sensing unit comprises a first sensor and a second sensor disposed on the input unit, wherein the second sensor is disposed at a second position on the input unit, wherein the second position is located at an end of the input unit; and the acquiring motion parameters of the input unit collected by a sensing unit comprises:

acquiring a first sensing parameter collected by the first sensor and a second motion parameter collected by the second sensor;

determining a first position on the input unit where the input unit is held by a user based on the first sensing parameter; and using the first position, the second position and the second motion parameter to determine the motion parameters of the input unit.

3. The method according to claim 1, wherein
the determining that the first trajectory meets a predetermined condition comprises:
determining that there is a breakpoint at a first position on the first trajectory; and
the using the motion parameters to correct the first trajectory in accordance with a first correction strategy comprises:
using the motion parameters to complement a portion of the first trajectory at the first position in accordance with the first correction strategy.

4. The method according to claim 1, wherein
the determining that the first trajectory meets a predetermined condition comprises:
determining that a legibility of the portion of the first trajectory is lower than a predetermined legibility; and
the using the motion parameters to correct the first trajectory in accordance with a first correction strategy comprises:
using the motion parameters to complement the portion of the first trajectory in accordance with the first correction strategy.

5. The method according to claim 1, further comprising: controlling the electronic apparatus to switch from a first state to a second state upon reception of a first signal transmitted by the sensing unit,
wherein, in the first state, the trajectory generated by the input unit is unrecognizable by the touch display unit of the electronic apparatus, and, in the second state, the trajectory generated by the input unit is recognizable by the touch display unit of the electronic apparatus;
wherein the detecting, with a touch display unit of the electronic apparatus, a first trajectory generated by a first input operation of an input unit comprises:
detecting, with the touch display unit of the electronic apparatus in the second state, the first trajectory generated by the first input operation of the input unit; and
the first signal is a signal collected by the sensing unit when the input unit is held by the user.

6. An electronic apparatus, comprising at least one processor and a memory having processor-executable instructions stored therein, and the instructions when executed by the at least one processor, configure the apparatus to:
detect, with a touch display unit of the electronic apparatus, a first trajectory generated by a first input operation of an input unit;
acquire motion parameters of the input unit collected by a sensing unit of the input unit in a case that it is determined that the first trajectory meets a predetermined condition, wherein the motion parameters of the input unit are collected by the sensing unit when the first trajectory is generated by the input unit
determine a portion of the first trajectory to be complemented;
determine a time period during which the portion of the first trajectory to be complemented is generated;
determine motion parameters collected by the sensing unit of the input unit during the time period; and
complement the portion of the first trajectory to be complemented based on the motion parameters collected by the sensing unit of the input unit during the time period.

7. The electronic apparatus according to claim 6, wherein the sensing unit comprises a first sensor and a second sensor disposed on the input unit, wherein the second sensor is disposed at a second position on the input unit, wherein the second position is located at an end of the input unit; and
the apparatus is further configured to:
acquire a first sensing parameter collected by the first sensor and a second motion parameter collected by the second sensor in a case that it is determined that the first trajectory meets the predetermined condition;
determine a first position on the input unit where the input unit is held by the user based on the first sensing parameter; and
use the first position, the second position and the second motion parameter to determine the motion parameters of the input unit.

8. The electronic apparatus according to claim 6, wherein the apparatus is further configured to acquire the motion parameters of the input unit collected by the sensing unit in a case that it is determined that there is a breakpoint at a first position on the first trajectory; and
use the motion parameters to complement the portion of the first trajectory at the first position in accordance with the first correction strategy.

9. The electronic apparatus according to claim 6, wherein the apparatus is further configured to
acquire the motion parameters of the input unit collected by the sensing unit in a case that it is determined that a legibility of the portion of the first trajectory is lower than a predetermined legibility; and
use the motion parameters to complement the portion of the first trajectory in accordance with the first correction strategy.

10. The electronic apparatus according to claim 6, wherein the electronic apparatus is further configured to:
control the electronic apparatus to switch from a first state to a second state upon reception of a first signal transmitted by the sensing unit, wherein in the first state, the trajectory generated by the input unit is unrecognizable by the touch display unit of the electronic apparatus, and in the second state, the trajectory generated by the input unit is recognizable by the touch display unit of the electronic apparatus;
detect, with the touch display unit of the electronic apparatus in the second state, the first trajectory generated by the first input operation of the input unit, wherein
the first signal is a signal collected by the sensing unit when the input unit is held by the user.

11. An information processing method, comprising:
detecting, with a touch display unit of an electronic apparatus, a first trajectory generated by a first input operation of an input unit,
wherein the first trajectory includes a break that divides the first trajectory into a first section and a second section that are not connected;
while the first trajectory is generated, acquiring motion parameters of the input unit collected by a sensing unit of the input unit in response to a determination that the first trajectory meets a predetermined condition;

determining a portion of the first trajectory to be complemented in order to connect the first section with the second section;

determining the motion parameters collected by the sensing unit of the input unit during a time period occurring when the portion was generated; and based on the motion parameters collected by the sensing unit of the input unit during the time period when the portion was generated, complementing the portion of the first trajectory and connecting the first section with the second section.

* * * * *